US007198227B2

(12) United States Patent
Olin et al.

(10) Patent No.: US 7,198,227 B2
(45) Date of Patent: Apr. 3, 2007

(54) AIRCRAFT CARGO LOCATING SYSTEM

(75) Inventors: Craig J. Olin, Jamestown, ND (US);
Blake A. Reed, Jamestown, ND (US);
Wally Larson, Jamestown, ND (US);
Steve Senger, Jamestown, ND (US);
Corey M. Larson, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 237 days.

(21) Appl. No.: 10/864,465

(22) Filed: Jun. 10, 2004

(65) Prior Publication Data

US 2006/0038077 A1    Feb. 23, 2006

(51) Int. Cl.
*B64C 1/20* (2006.01)

(52) U.S. Cl. .................... 244/118.1; 244/137.1

(58) Field of Classification Search ........... 244/137.1, 244/118.1; 340/572.1, 573.2, 573.3, 573.4; 119/174, 721, 51.02
See application file for complete search history.

(56) References Cited

U.S. PATENT DOCUMENTS

| | | | | | |
|---|---|---|---|---|---|
| 3,639,897 | A | * | 2/1972 | Teich ........................ 340/430 |
| 3,656,100 | A | * | 4/1972 | Beltrami .................... 307/10.3 |
| 3,665,449 | A | * | 5/1972 | Elder et al. ............... 340/572.1 |
| 3,688,256 | A | * | 8/1972 | D'Ausilio et al. .......... 340/430 |
| 3,697,941 | A | * | 10/1972 | Christ ........................ 340/991 |
| 3,735,335 | A | * | 5/1973 | Kaplan et al. .............. 340/991 |
| 3,757,290 | A | * | 9/1973 | Ross et al. .................. 340/991 |
| 3,772,669 | A | * | 11/1973 | Johnston et al. ............ 327/304 |
| 3,848,243 | A | * | 11/1974 | Shirmer ...................... 340/517 |
| 3,961,323 | A | * | 6/1976 | Hartkorn ................... 340/539.1 |
| 4,095,872 | A | * | 6/1978 | Stieff et al. .................. 385/115 |
| 4,209,787 | A | * | 6/1980 | Freeny, Jr. .................. 342/457 |
| 4,262,284 | A | * | 4/1981 | Stieff et al. .................. 340/541 |
| 4,529,982 | A | * | 7/1985 | Karlstrom et al. .......... 340/991 |
| 4,536,754 | A | * | 8/1985 | Holce et al. ............... 340/568.2 |
| 4,627,248 | A | * | 12/1986 | Haworth ...................... 70/134 |
| 4,683,461 | A | * | 7/1987 | Torre .......................... 340/551 |
| 4,688,244 | A | * | 8/1987 | Hannon et al. ............... 377/58 |
| 4,750,197 | A | * | 6/1988 | Denekamp et al. ....... 455/404.2 |
| 4,768,816 | A | * | 9/1988 | Bakula ........................ 292/218 |
| 4,811,578 | A | * | 3/1989 | Masoncup et al. .......... 70/38 B |
| 4,811,977 | A | * | 3/1989 | Swift et al. .............. 292/307 A |

(Continued)

FOREIGN PATENT DOCUMENTS

EP    WO 0190707    11/2001

OTHER PUBLICATIONS

"Boeing and Airbus complete Joint Industry Forums," Source: The STAT Trade Times, Nov. 20, 2001, http://www.tiaca.org/articles/2001/11/20/A5B14A6413424556B5D41B9752F4A5.asp , (date printed: Jun. 9, 2005).

(Continued)

*Primary Examiner*—Timothy D. Collins
(74) *Attorney, Agent, or Firm*—Womble Carlyle

(57) ABSTRACT

An aircraft cargo locating system determines the location and weight of aircraft cargo placed in unit loading devices. A wireless tag, such as an Radio Frequency Identification (RFID) tag is affixed to each of the loading devices. The system receives information from the tags, and from the information calculates the location of the loading devices and the weight of the loading devices. The system is able to calculate weight and balance parameters to assist in the loading process.

41 Claims, 13 Drawing Sheets

U.S. PATENT DOCUMENTS

| | | | | |
|---|---|---|---|---|
| 4,816,803 A * | 3/1989 | Brown | | 340/426.28 |
| 4,833,295 A * | 5/1989 | Locker et al. | | 219/121.63 |
| 4,853,692 A * | 8/1989 | Wolk et al. | | 340/573.1 |
| 4,877,276 A * | 10/1989 | Pastva | | 292/218 |
| 4,920,334 A * | 4/1990 | DeVolpi | | 340/568.4 |
| 4,946,210 A * | 8/1990 | Fuehrer | | 292/318 |
| 4,990,890 A * | 2/1991 | Newby | | 340/426.18 |
| 4,996,909 A * | 3/1991 | Vache et al. | | 454/184 |
| 5,005,883 A * | 4/1991 | Guiler | | 292/327 |
| 5,025,243 A * | 6/1991 | Ichikawa | | 338/18 |
| 5,050,794 A * | 9/1991 | Wischusen, III | | 229/125.26 |
| 5,056,837 A * | 10/1991 | Fuehrer | | 292/307 R |
| 5,097,253 A * | 3/1992 | Eschbach et al. | | 340/545.1 |
| 5,120,097 A * | 6/1992 | Fattori et al. | | 292/318 |
| 5,125,700 A * | 6/1992 | Fattori et al. | | 292/318 |
| 5,127,687 A * | 7/1992 | Guiler | | 292/327 |
| 5,171,048 A * | 12/1992 | Weinerman et al. | | 292/45 |
| 5,189,396 A * | 2/1993 | Stobbe | | 340/541 |
| 5,247,564 A * | 9/1993 | Zicker | | 379/40 |
| 5,284,036 A * | 2/1994 | Rosenbaum | | 70/14 |
| 5,347,274 A * | 9/1994 | Hassett | | 340/988 |
| 5,422,627 A * | 6/1995 | Tap et al. | | 340/542 |
| 5,443,190 A * | 8/1995 | Cucheran et al. | | 224/405 |
| 5,490,079 A * | 2/1996 | Sharpe et al. | | 705/418 |
| 5,538,283 A * | 7/1996 | Townsend | | 280/801.1 |
| 5,572,191 A * | 11/1996 | Lundberg | | 340/572.6 |
| 5,594,738 A * | 1/1997 | Crisler et al. | | 370/347 |
| 5,627,517 A * | 5/1997 | Theimer et al. | | 340/572.1 |
| 5,631,642 A * | 5/1997 | Brockelsby et al. | | 340/993 |
| 5,656,996 A * | 8/1997 | Houser | | 340/541 |
| 5,686,902 A * | 11/1997 | Reis et al. | | 340/10.2 |
| 5,774,876 A * | 6/1998 | Woolley et al. | | 705/28 |
| 5,793,290 A * | 8/1998 | Eagleson et al. | | 340/573.4 |
| 5,804,802 A * | 9/1998 | Card et al. | | 235/375 |
| 5,804,810 A * | 9/1998 | Woolley et al. | | 235/492 |
| 5,892,441 A * | 4/1999 | Woolley et al. | | 340/539.26 |
| 5,959,568 A * | 9/1999 | Woolley | | 342/42 |
| 5,977,913 A * | 11/1999 | Christ | | 342/465 |
| 6,002,344 A | 12/1999 | Bandy et al. | | |
| 6,034,603 A * | 3/2000 | Steeves | | 340/10.2 |
| 6,067,476 A * | 5/2000 | Siler | | 700/79 |
| 6,069,563 A * | 5/2000 | Kadner et al. | | 340/571 |
| 6,094,164 A * | 7/2000 | Murphy | | 342/357.07 |
| 6,097,301 A * | 8/2000 | Tuttle | | 340/693.9 |
| 6,140,956 A * | 10/2000 | Hillman et al. | | 342/357.07 |
| 6,243,005 B1 * | 6/2001 | Haimovich et al. | | 340/427 |
| 6,265,975 B1 * | 7/2001 | Zimmerman | | 340/571 |
| 6,275,769 B1 | 8/2001 | Willis | | |
| 6,281,793 B1 * | 8/2001 | Haimovich et al. | | 340/545.1 |
| 6,281,797 B1 * | 8/2001 | Forster et al. | | 340/572.3 |
| 6,294,953 B1 * | 9/2001 | Steeves | | 329/341 |
| 6,298,306 B1 * | 10/2001 | Suarez et al. | | 701/213 |
| 6,339,745 B1 * | 1/2002 | Novik | | 701/208 |
| 6,342,836 B2 * | 1/2002 | Zimmerman | | 340/571 |
| 6,367,737 B1 * | 4/2002 | Lohse et al. | | 244/13 |
| 6,490,895 B1 * | 12/2002 | Weinerman et al. | | 70/208 |
| 6,520,472 B1 | 2/2003 | Manich et al. | | |
| 6,539,050 B1 * | 3/2003 | Lee et al. | | 375/146 |
| 6,695,555 B2 | 2/2004 | Eilenstein et al. | | |
| 6,724,308 B2 * | 4/2004 | Nicholson | | 340/572.1 |
| 6,765,484 B2 * | 7/2004 | Eagleson et al. | | 340/505 |
| 6,807,458 B2 * | 10/2004 | Quackenbush et al. | | 700/213 |
| 6,825,766 B2 | 11/2004 | Hewitt et al. | | |
| 6,842,121 B1 | 1/2005 | Tuttle | | |
| 6,867,702 B2 | 3/2005 | Huber et al. | | |
| 6,879,806 B2 * | 4/2005 | Shorty | | 455/11.1 |
| 6,883,710 B2 | 4/2005 | Chung | | |
| 6,940,392 B2 * | 9/2005 | Chan et al. | | 340/10.4 |
| 6,973,385 B2 * | 12/2005 | Ulrich | | 701/207 |
| 6,995,654 B2 * | 2/2006 | Nysen | | 340/7.1 |
| 7,003,374 B2 * | 2/2006 | Olin et al. | | 700/213 |
| 2001/0052850 A1 * | 12/2001 | Zimmerman | | 340/572.1 |
| 2002/0089434 A1 | 7/2002 | Ghazarian | | |
| 2002/0119031 A1 * | 8/2002 | Karlen | | 414/137.1 |
| 2002/0134835 A1 | 9/2002 | Kennedy | | |
| 2002/0153996 A1 * | 10/2002 | Chan et al. | | 340/10.4 |
| 2003/0117268 A1 | 6/2003 | Hewitt et al. | | |
| 2003/0189094 A1 | 10/2003 | Trabitz | | |
| 2004/0069850 A1 | 4/2004 | De Wilde | | |
| 2004/0078122 A1 * | 4/2004 | Pippenger | | 701/3 |
| 2004/0098272 A1 | 5/2004 | Kapsis et al. | | |
| 2004/0169587 A1 * | 9/2004 | Washington | | 340/573.1 |
| 2004/0222888 A1 | 11/2004 | Young et al. | | |
| 2005/0140150 A1 * | 6/2005 | Hall et al. | | 292/336.3 |
| 2005/0232747 A1 * | 10/2005 | Brackmann et al. | | 414/803 |
| 2005/0246057 A1 * | 11/2005 | Olin et al. | | 700/213 |
| 2005/0246132 A1 * | 11/2005 | Olin et al. | | 702/174 |
| 2005/0248136 A1 * | 11/2005 | Breed et al. | | 280/735 |
| 2006/0026017 A1 * | 2/2006 | Walker | | 705/1 |

OTHER PUBLICATIONS

"Overhaul & Maintenance," RFID: Knowledge Enabled Logistics, by Lee Ann Tegtmeier, Jun. 7, 2004; www.aviationnow.com/avnow/news/channel_om_story.jsp?is=news/om605RFID.xml (date printed: Jul. 12, 2004).

www.wherenet.com/products_main.html: WhereLAN, Location Sensor Locating Access Point; WhereTags; WheretagIII; WherePort; Visibility Server Software, 2003 WhereNet Corp., http://www.wherenet.com/products_main.html (date printed: Apr. 13, 2004).

"Accident Prevention Program, Weight and Balance," A.P.O., Weight and Balance, http://www.cyberair.com;tower/faa/app/p8740-5.html (date printed: Dec. 11, 2003).

* cited by examiner

1100

| RFID Tag No. | ULD Type | Grid Deck | Destination Location | Gr. Wt. | Contents (Kg) | |
|---|---|---|---|---|---|---|
| 6634567890 | ULD-3 | Main | G-14 | Frankfurt | 345 | ABC Co Med. Equip |
| 3782010132 | ULD-3 | Main | G-14 | Frankfurt | 228 | ABC Co Med. Equip |
| 3454230892 | ULD-3 | Upper | B-4 | Frankfurt | 225 | Luftpost |
| 2345235224 | ULD-9 | Aft Lower | A-3 | Berlin | 323 | DEF Co. Chemicals |
| 1326262142 | ULD-9 | Aft Lower | C-4 | Berlin | 374 | GHI Co. Chemicals |
| etc. | etc. | etc. | etc. | etc. | etc. | etc. |

*Fig. 11*

AIRCRAFT CARGO LOCATING SYSTEM

FIELD OF THE INVENTION

The present invention is directed to aircraft that carry cargo. More particularly, it is directed to a system for locating and tracking the position of unit load devices on such aircraft.

BACKGROUND INFORMATION

With the increasing emphasis on packages, mail, and other such items having to arrive "overnight", more and more cargo is being shipped by aircraft 100 (See FIG. 1). While some aircraft are configured to transport cargo only (so called, "freighters"), others are configured to transport both passengers and cargo.

Typically, the items being shipped are first loaded onto pallets, containers, or the like. In the airfreight industry, any one of these various categories of devices is referred to as a Unit Load Device 102 (ULD). Within each category, the ULDs come in various sizes, shapes and capacities and bear markings that identify their type, maximum gross weight and tare weight, among other characteristics.

This initial task of placing the items to be shipped into a ULD may be performed at a location away from the immediate vicinity of the aircraft. In due course, however, the ULD is weighed, brought to the aircraft and sent up a ramp 106, scissors lift, or other means and then through a doorway 108. Once inside, the ULD is moved about the cargo compartment until it reaches its final position for the flight. As depicted in FIG. 2, on any given flight, a cargo aircraft 200 can carry a number of ULDs 202, of which aforementioned ULD 102 may be just one example, and so additional ULDs are brought onboard and placed in their proper positions. In certain aircraft, not all ULDs are in the same compartment, some being placed in the forward compartment 204 while others being placed in the aft compartment 206. And, as seen in the forward compartment 204, even ULDs of the same type need not necessarily all be adjacent to one another. Also, in many aircraft, ULDs may be placed on different vertical levels, or decks.

To facilitate moving around the ULD within the cargo compartment, the floor of the cargo compartment is provided with a number of structures with raised surfaces. These structures may take the form of parallel roller tracks arranged longitudinally along the length of the cargo floor, ball panel units, and the like. The bottom surface of the ULD rides on the raised surfaces provided by the rollers and balls of these structures, as it is moved within the compartment.

Once moved to its final position, further movement of the ULD is prevented for duration of the flight. This is done to ensure that the ULD will not move about when the aircraft is subjected to rough air, vibrations, acceleration, deceleration, and rough landings. To prevent movement of the ULD in flight, the floor and side walls of the cargo compartment may be provided with restraints that serve to keep the ULD stationary.

The number of ULDs, the types of ULDs to be carried, and the weight of each ULD can change from flight to flight. Great care must be taken when loading aircraft with cargo to assure that the weight and balance of the aircraft with the loaded cargo is acceptable. In part, this is because an aircraft can be damaged while sitting on the ground if the cargo weight distribution is incorrect, causing the aircraft to "tip" onto its tail. And in flight, aircraft performance and handling characteristics are affected by the gross weight and center of gravity limits. An overloaded or improperly balanced aircraft will require more power and greater fuel consumption to maintain flight, and the stability and controllability may be seriously affected. Lack of appreciation for the effects of weight and balance on the performance of aircraft, particularly in combination with such performance reducing factors as high density altitude, frost or ice on the wings, low engine power, severe or uncoordinated maneuvers, and emergency situations, can be a prime factor in aircraft accidents.

Before the ULDs are loaded, the load master, or other cognizant individual, develops a pre-planned load configuration that takes into account the weight and balance criteria, and the number, types and weights of the ULDs. This pre-planned load configuration indicates where, on the cargo floor, each of the ULDs to be loaded onto the aircraft, should be positioned. In its simplest form, then, the pre-planned load configuration is simply a two-column list, the first column identifying each ULD and the second its corresponding desired final location within the aircraft. In general, however, the pre-planned load configuration is part of a more comprehensive cargo loading manifest that may also include information about the weight of each ULD, among other items. The loading crew tasked with loading the aircraft receives a print out of the pre-planned load configuration, and loads the cargo hold accordingly.

However, a typical main deck freighter aircraft can have hundreds of permutations for cargo loading configurations. For this reason, it can be a difficult task to ensure that the ground crew has loaded the aircraft correctly for an intended load. It is therefore desirable to provide real time weight and location of all of the loaded cargo to calculate the weight and balance of the aircraft, as well as to track the cargo while loading the aircraft and later at the conclusion of the flight while the cargo is being unloaded.

The prior art includes RFID tags and RFID readers. A tag may be placed on an item and later scanned by an RFID reader, thereby tracking that item. Wireless systems, such as those provided by Wherenet (www.wherenet.com) may be used to track and locate objects in a variety of settings.

SUMMARY OF THE INVENTION

In one aspect, the present invention is directed to an aircraft cargo locating system for locating a plurality of unit load devices (ULDs) in an aircraft, each ULD having a wireless tag affixed to it. The system includes a plurality of tag readers for reading the wireless tags, and a processor coupled to the tag readers. The processor is programmed to receive tag information from the plurality of tag readers and calculate a location of each of the ULDs devices in the aircraft from the tag information.

In another aspect, the present invention is directed to a method of locating a unit load device (ULD) device on a deck of an aircraft. The method entails receiving, at a plurality of tag readers, tag information from a wireless tag affixed to the ULD, and then calculating a location of the ULD within a cargo compartment of the aircraft based on the tag information received at the plurality of tag readers.

In still another aspect, the present invention is directed to a computer readable medium having instructions stored thereon that, when executed by a processor, cause the processor to receive tag information from a wireless tag affixed to an aircraft unit load device (ULD) carrying cargo, and then calculate a location of the ULD within the aircraft based on this tag information.

In still another aspect, the present invention is directed to a method of loading an aircraft. The method entails obtaining information about weights of a plurality of unit load devices (ULD) as they enter an aircraft, and determining whether a tip condition is imminent, based at least in part on the weights and positions of said plurality of ULDs that are onboard the aircraft, the positions having been determined by wirelessly sensing the locations of the ULDs.

In still another aspect, the present invention is directed to an aircraft unit load device (ULD) bearing a wireless tag comprising a memory, said memory comprising information reflective of a gross weight of the ULD, a flight number of an aircraft, and a location within said aircraft that said ULD is to be placed.

In still another aspect, the present invention is directed to an aircraft having a cargo compartment provided with a plurality of tag readers spaced apart along opposing side walls thereof, each tag reader capable of receiving information from a wireless tag, a processor coupled to the plurality of tag readers and configured to determine locations of wireless tags based on tag information received by said tag readers, when such wireless tags are present in the compartment, and a user interface configured to display output from the processor that is derived from information received by said plurality of tag readers.

BRIEF DESCRIPTION OF THE DRAWINGS

FIG. 11 shows a sample tabular report from the database of ULDs loaded onto the aircraft.

FIG. 12a shows a sample window on a display depicting the center of gravity in real-time, as a cargo deck is being loaded.

DETAILED DESCRIPTION

Figure 1A:
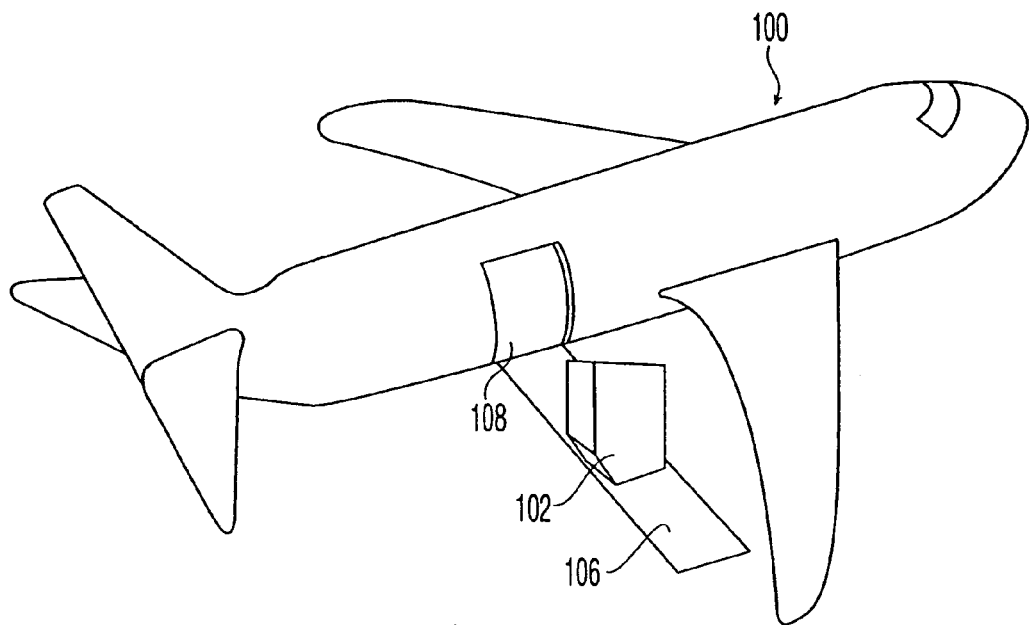
FIGS. 1a and 1b show cargo loaded onto an aircraft, in accordance with the prior art.
Figure 1B:
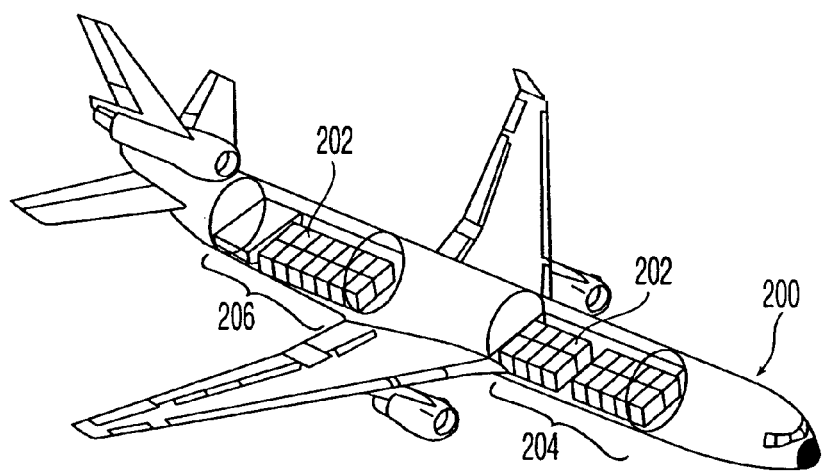
Figure 2A:
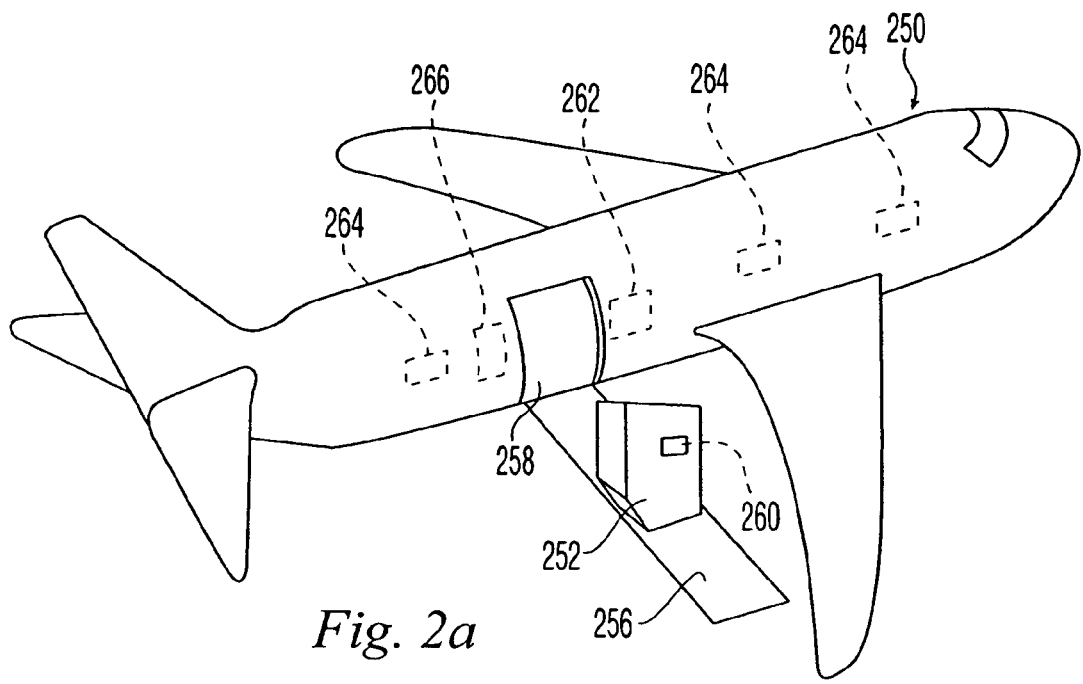
FIGS. 2a and 2b show cargo loaded onto an aircraft, in accordance with the present invention

FIG. 2a shows an aircraft 250 in accordance with the present invention, onto which a ULD 252, also in accordance with the present invention, is about to be loaded via a ramp 256, through a doorway 258 and into a cargo compartment.

The ULD 252 bears a wireless tag 260, such as an RFID tag. As is known to those skilled in the art, RFID tags are small, inexpensive devices that can be programmed with unique information and may either be active or passive. Preferably, RFID tag 260 is an active tag which has a self-contained battery and has a memory to which one may read/write/modify data. The battery life for such a tag is preferably between five and ten years, depending on the particular type selected, which avoids frequent maintenance of the RFID tags on the ULDs.

Figure 2B:
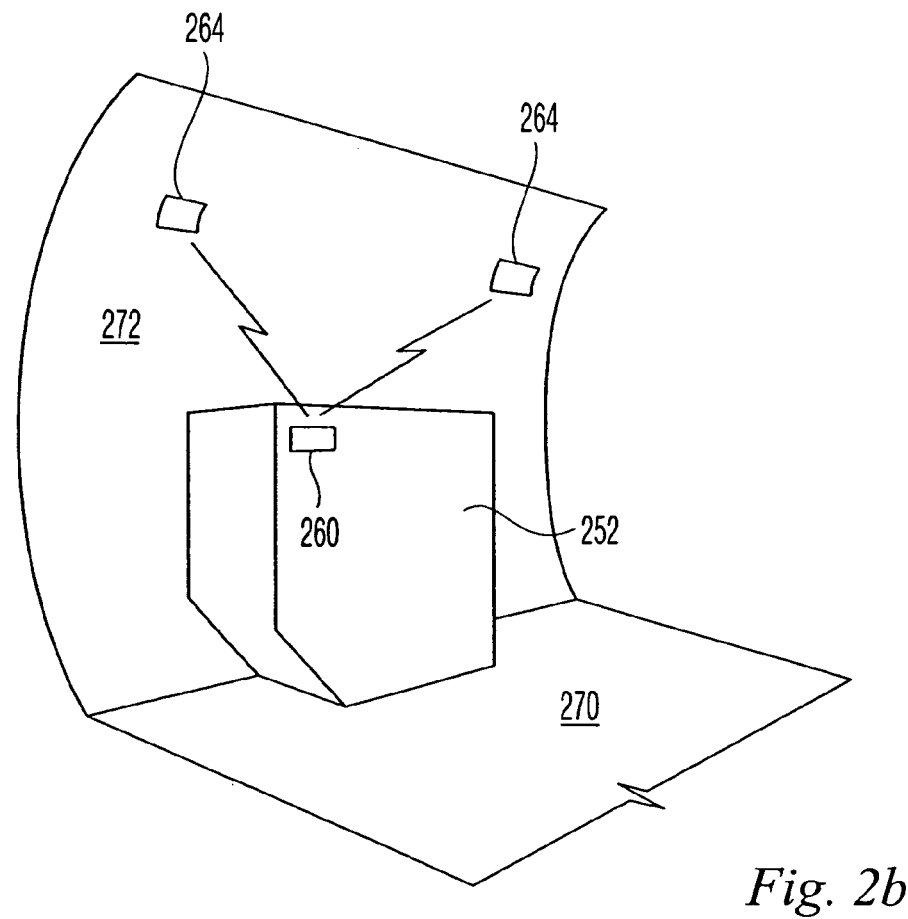

The cargo compartment wall 272 of the cargo aircraft 250 is provided with a plurality of tag readers 262, 264, as shown in FIG. 2b. The readers 262, 264, which preferably are RFID readers, are linked together via a communications bus, described further below. In a preferred embodiment, each RFID reader's board or other hardware is co-located with its antenna, although this is not an absolute requirement.

In the embodiments described herein, reference is made to RFID tags and RFID readers. It is understood, however, that other types of wireless technologies, protocols and the like, such as infrared, ultrasonic, bluetooth, various WiFi and other wireless standards (802.1x), etc. may also be employed, the important feature of the present invention being that the tags be wireless and that the tag readers be able to receive information from the wireless tags.

Preferably, reader 262 is a short-range reader that is associated with the doorway 258 ("doorway reader") and senses when a ULD passes through the doorway 258. Reader 262 therefore is close to the doorway, such as being immediately adjacent to the doorway or perhaps even being situated in the door jamb itself. Beyond the immediate vicinity of the doorway 258, however, the doorway reader 262 is unable to pick up the tags.

Figure 2C:
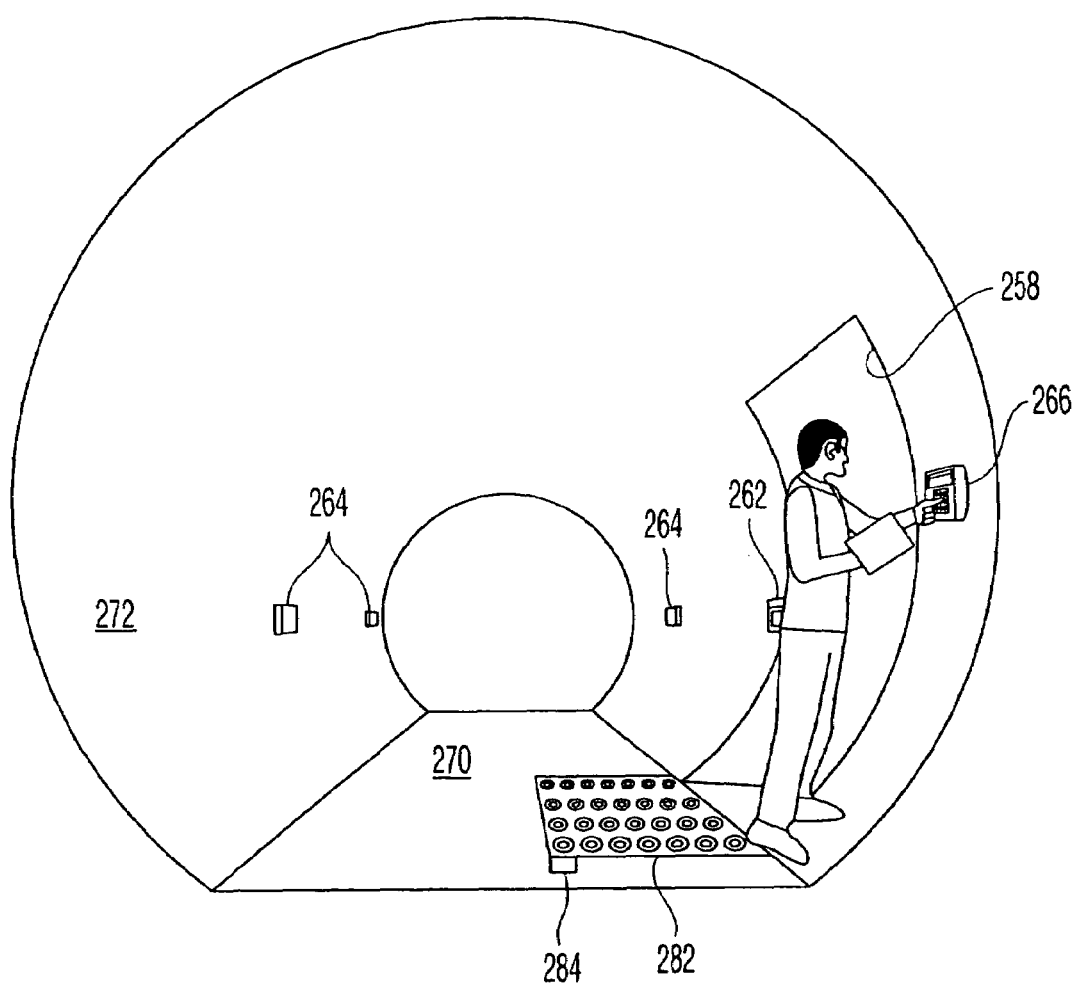
FIG. 2c illustrates the inside of a cargo hold corresponding the FIG. 2b.

As seen in FIG. 2c, the cargo compartment's "omni area" (i.e., the area that allows cargo to be moved in a variety of directions) immediately inside the doorway 258 may be provided with a ball mat 282 equipped with load cells 284 to weigh the ULDs, as they are brought through the doorway area.

Away from the doorway 258, a plurality of long-range readers 264 are provided on the cargo compartment wall 272, at spaced intervals throughout the cargo compartment. Typically, the long-range readers 264 are placed only on both side walls of the cargo compartment, but may also be placed on its ceiling and/or its floor 270, if necessary.

In contrast to the short-range doorway reader 262, the long-range readers 264 are capable of locating ULDs bearing tags 260 at distances upwards of about 70 feet. In one embodiment, the short-range doorway reader 262 and the long-range doorway readers 264 have identical construction, differing only in their effective range, as determined by a settable power level. In another embodiment, the short-range doorway reader 262 and the long-range doorway readers 264 differ in construction.

Once inside the cargo compartment, the ULD 252 is moved to its final location on the cargo floor 270, in accordance with the cargo loading manifest. And from its final location, ULD 252, or more precisely its tag 260, can be detected from three or more of the long-range readers which may then provide respective delay of arrival, signal strength or other data to a computer for a triangulation algorithm of the sort known to those skilled in the art for determining the precise location of the ULD 252.

A cargo area user interface 266 is provided on the cargo compartment wall 272 near the doorway 258 for communicating with a cargo loading computer, as discussed further below. The cargo area user interface 266 preferably comprises an LCD display with perhaps a touch panel or complete keyboard attached thereto. An operator 290 may use this interface 266 to monitor the loading of cargo and enter data, as needed. While the cargo area user interface 266 is shown as a display with keyboard mounted on the wall, it is understood that it may take other forms, such as a laptop computer or a wireless handheld device, among others.

Figure 3:
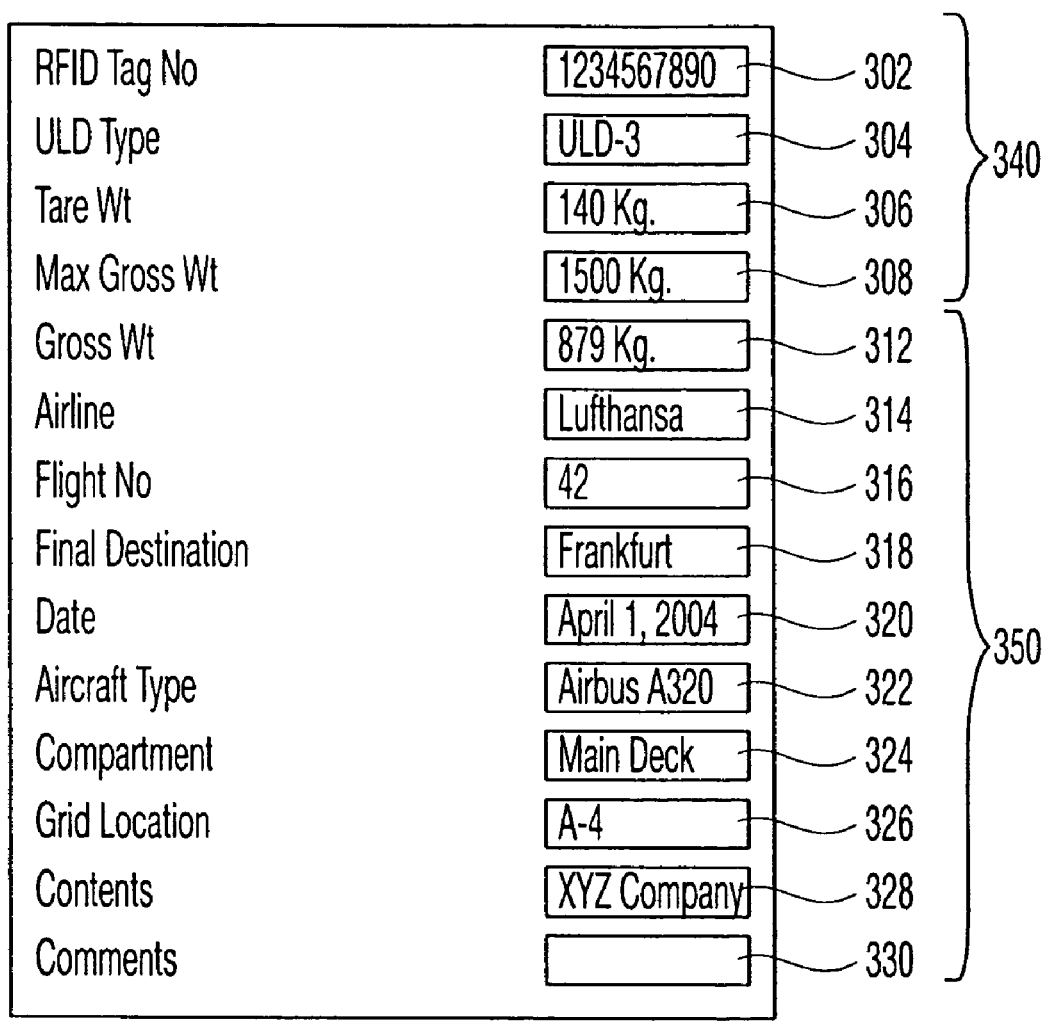
FIG. 3 illustrates the contents stored in a wireless tag in accordance with the present invention.

FIG. 3 presents a table 300 representing the nature of tag information that may be stored in the memory of a tag 260 in accordance with the present invention. It is understood that FIG. 3 is for illustrative purposes only, the memory locations not necessarily storing the description of each data item. Generally speaking, the type of tag information stored in the tag 260 comprises a first set of data fields 340 that is associated with a particular ULD and does not change from one flight to the next ("ULD-specific information"), and a second set of data fields 350 that changes from one flight to the next ("non-ULD specific information").

The first set of data fields 340 preferably belongs to a first portion of memory that cannot normally be overwritten. This may be achieved, for instance, by using a memory that cannot be erased, or by write-protecting the first portion through software or other means.

The second set of data fields 350, on the other hand, belongs to a second portion of memory that may be overwritten by the programming software used at the cargo terminal where the ULDs are loaded with cargo and tags are programmed. In a preferred embodiment, this second portion of memory is automatically erased by hardware and/or software on the tag itself, so that "old" information does not persist in the second set of data fields 350 after the ULD has been removed from the aircraft and its cargo unloaded. Thus, the automatic erasure preferably takes place after the lapse of a predetermined period of time estimated to be sufficient for the ULD to reach its destination and be unloaded. Thus, in one embodiment, the predetermined period of time may be a fixed number of hours, such as 24 hours.

The ULD-specific information 340 typically includes a unique tag number 302 which can be used to identify the tag itself (and thus the ULD from simply the tag number, assuming the one is associated with the other), the type of ULD 304, the empty weight 306 of the ULD and the maximum gross weight 308 of the ULD.

The non-ULD-specific information 350 which may vary from flight to flight may include: the gross (loaded) weight 312 of the ULD, the name of the airline 314 on which the ULD is to be loaded, the flight number 316, the final destination 318 of the ULD (which may help ensure that a ULD is not off-loaded at the wrong stop), the date of the flight 320, the type of aircraft 322 on which the ULD is being transported, the compartment 324 in the aircraft in which the ULD will be transported, the two-dimensional grid location 326 within the compartment where the ULD is to be placed, information about the contents or owner 328 of the contents, and additional comments 330 such as problems with the ULD, as needed.

The non-ULD specific information typically is entered at the cargo terminal or other staging area where the individual ULDs are loaded with cargo. The ULDs, loaded with cargo, are weighed and the various non-ULD specific information 350 is uploaded to the ULD through a write operation using devices known to those skilled in the art.

Figure 4:
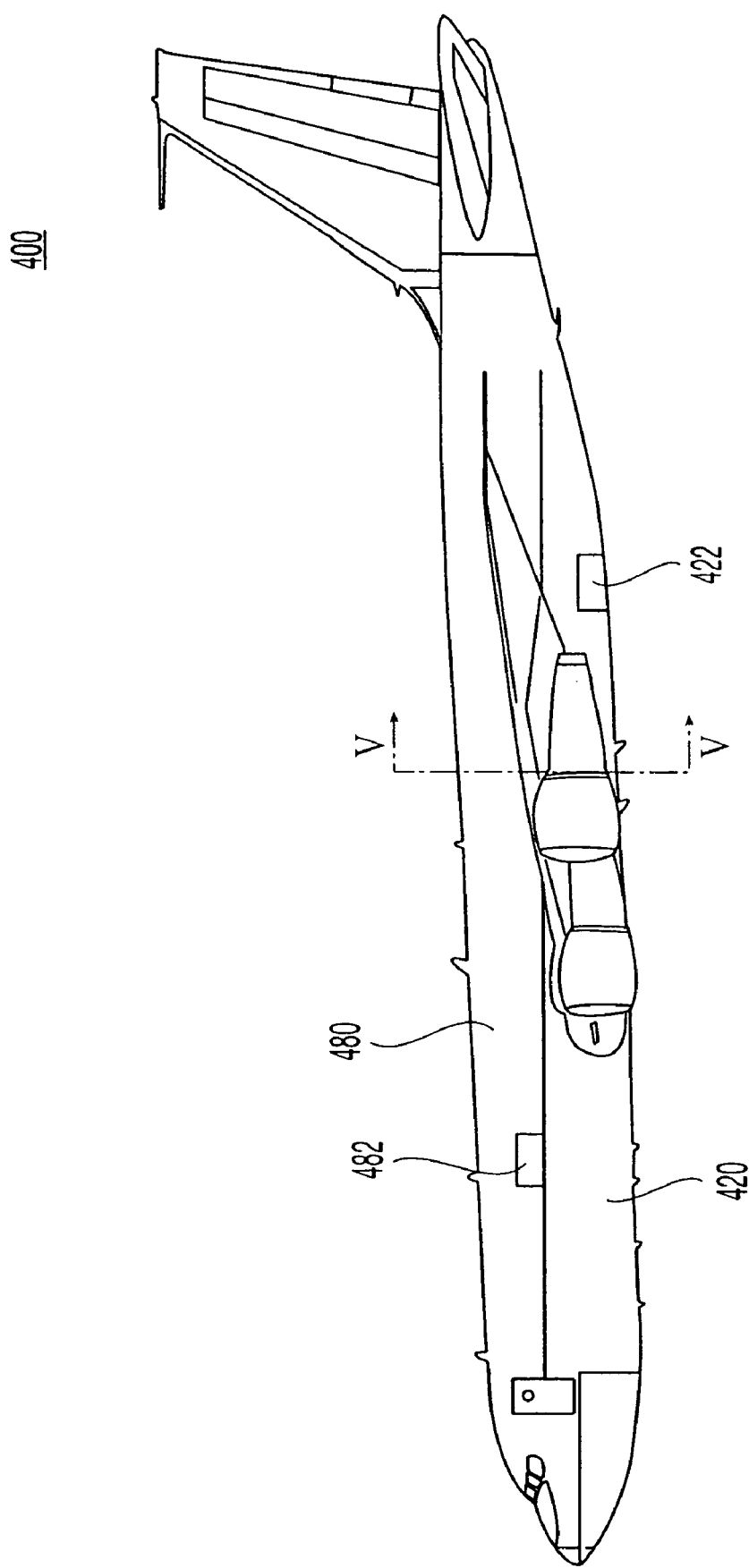
FIG. 4 shows a side view of a two-level cargo aircraft of the sort used in connection with the present invention.

FIG. 4 shows a cargo aircraft 400 with two cargo compartments, one on each level. Lower cargo compartment 420 receives cargo through a single cargo door 422 near the aft portion of the aircraft. Upper cargo compartment 480 receives cargo through a single cargo door 482 located forward of the wings. It is understood that a short-range doorway reader 262 is placed near each door 422, 482 on the inside of the aircraft while long-range 264 readers are found on side walls and possibly even the ceiling and/or floor of each compartment, just as in the case of the single-compartment aircraft 400 of FIG. 2b. It is further understood that in a preferred embodiment, each cargo compartment 420, 480 is provided with a cargo area user interface 266 for an operator to communicate with the cargo loading computer.

Figure 5:
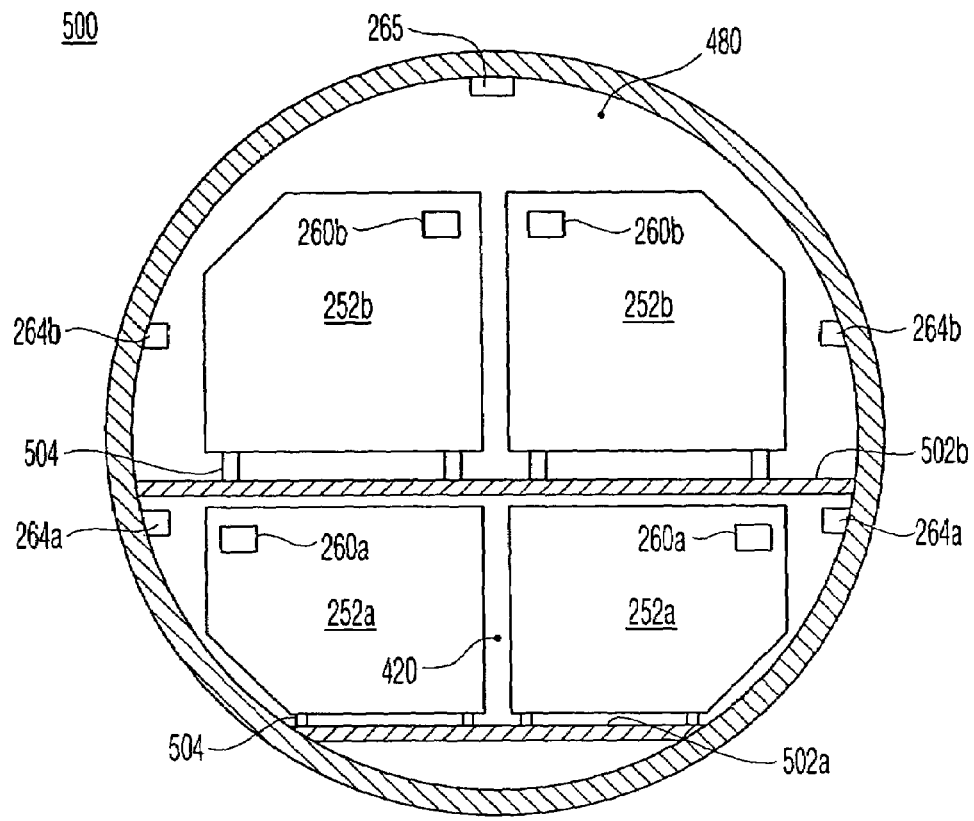
FIG. 5 shows a cross-section of the cargo aircraft of FIG. 4 loaded with tagged ULDs and equipped with readers in accordance with the present invention.

FIG. 5 shows a cross-section of the cargo plane 400 loaded with cargo. As seen in FIG. 5, there are two cargo floors, or decks 502a, 502b, corresponding to the two cargo compartments 420, 480, respectively. The decks 502a, 502b, are provided with rollers 504 which, as is known to those skilled in the art of cargo planes, facilitate movement of ULDs within a compartment.

In the cross-section of FIG. 5, a number of ULDs bearing wireless tags, and long-range readers on the side walls, can be seen. It is understood, however, that all these items are not necessarily in the plane of the cross-section, but rather would be visible from the cross-section.

A pair of ULDs 252a of a first type rest on rollers 504 on the lower deck 502a which corresponds to lower cargo compartment 420. Each ULD has a wireless tag 260a, and the position of these are detected using long-range readers 264a.

Similarly, on the upper deck 502b, a pair of ULDs 252b of a second type rest on rollers 504 within the upper cargo compartment 480. Each of these ULDs has a wireless tag 260b, and the position of these are detected using long-range readers 264b. As also seen in this figure, a long-range reader 265 is placed on the ceiling of the upper compartment 480, the lower compartment in this embodiment, not being so provided.

In practice, a long-range reader on one deck may receive signals from a wireless tag affixed to a ULD on a different deck. However, this normally does not cause ambiguities in determining the position of a particular ULD for a combination of reasons. First, once a ULD is loaded onto a particular deck through a particular doorway, it is not normally moved within the aircraft to a different deck. And due to the short-range doorway readers, the system of the present invention knows through which doorway (and thus on which deck) every ULD entered the aircraft. The system also knows in which compartment each long-range reader is situated, and its position within the compartment. Thus, when processing signals received at the various long-range readers to establish the location of a particular ULD, the system only uses signals from wireless tags (and hence, the corresponding ULDs) that are on the same deck as the long-range readers at which the signals were received. The dual features of keeping track of the deck on which a ULD is located and ignoring or otherwise rejecting signals from that ULD received by long-range readers on other decks, also finds use while loading the aircraft and building a table of loaded ULDs, as discussed below.

Figure 6A:
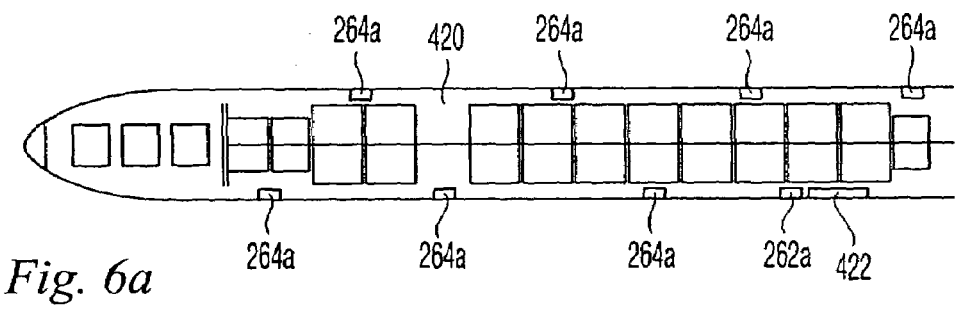
FIG. 6 shows a typical placement of readers on the main (a) and cargo (b) decks of the aircraft of FIG. 4.
Figure 6B:
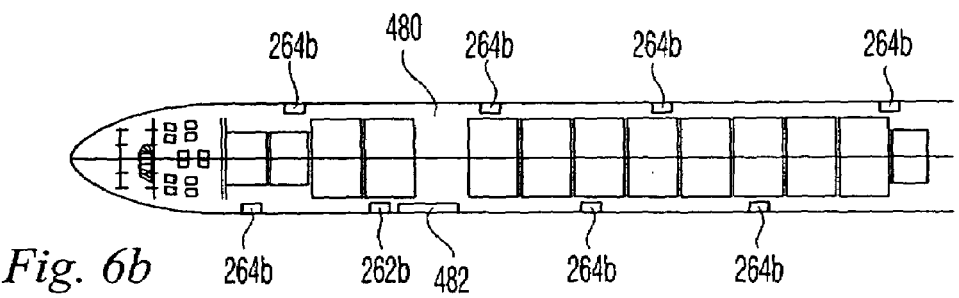

FIGS. 6a and 6b show a plan view of the ULDs loaded in the lower 420 and upper 480 cargo compartments, respectively. The lower cargo compartment 420 has a first short-range doorway reader 262a adjacent the lower cargo door 422 while the upper cargo compartment 480 has a second short-range doorway reader 262b near the upper cargo door 482. A plurality of long-range readers 264a, 264b are arranged along the side walls of the two compartments. Preferably, the long range readers are no more than 50 to 70 feet apart along any one side wall, the long-range readers on one side wall being staggered relative to the long-range readers on the other side wall. This helps ensure that each wireless tag on a ULD can be read by three long-range readers to help with locating each such tag, and thus the associated ULD.

Figure 7:
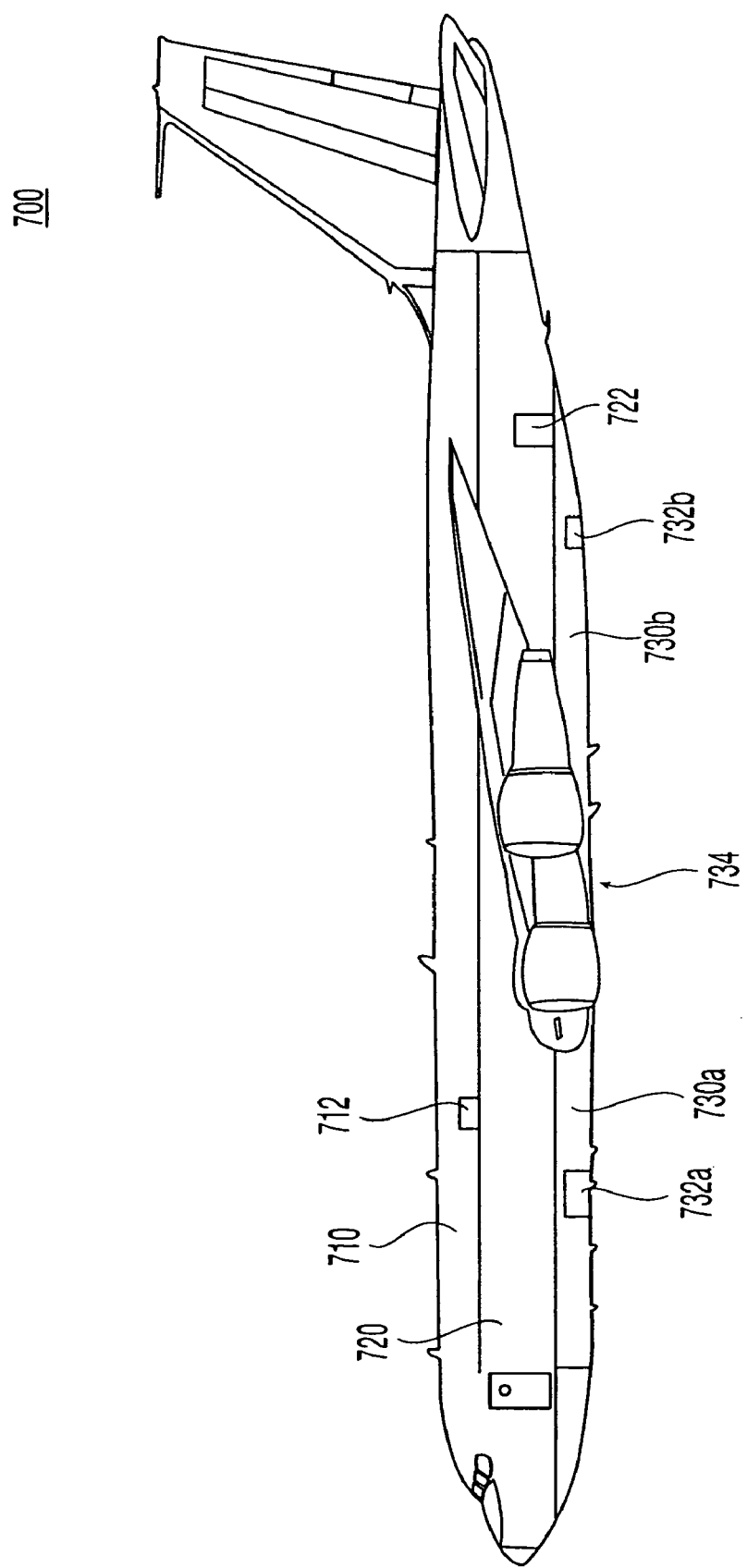
FIG. 7 shows a side view of three-level cargo aircraft of the sort used in connection with the present invention.

FIG. 7 shows a cargo aircraft 700 with three levels and four cargo compartments. The upper deck has an upper cargo compartment 710 that receives cargo through cargo door 712, and the main deck has a main cargo compartment 720 that receives cargo through cargo door 722. The lower deck has a forward cargo lobe 730a that is loaded through cargo door 732a and an aft cargo lobe 730b that is loaded through cargo door 732b. The forward and aft cargo loads in this instance are separated by structures within the fuselage supporting the wings 734. It is understood that a short-range doorway reader 262 is placed near each cargo door 712, 722, 732a and 732b on the inside of the aircraft 700, while long-range readers 264 are found on side walls and possibly even the ceiling and/or floor of each of the compartments and lobes. It is further understood that in a preferred embodiment, each of these compartments are provided with a cargo area user interface 266 for an operator to communicate with the cargo loading computer.

Figure 8:
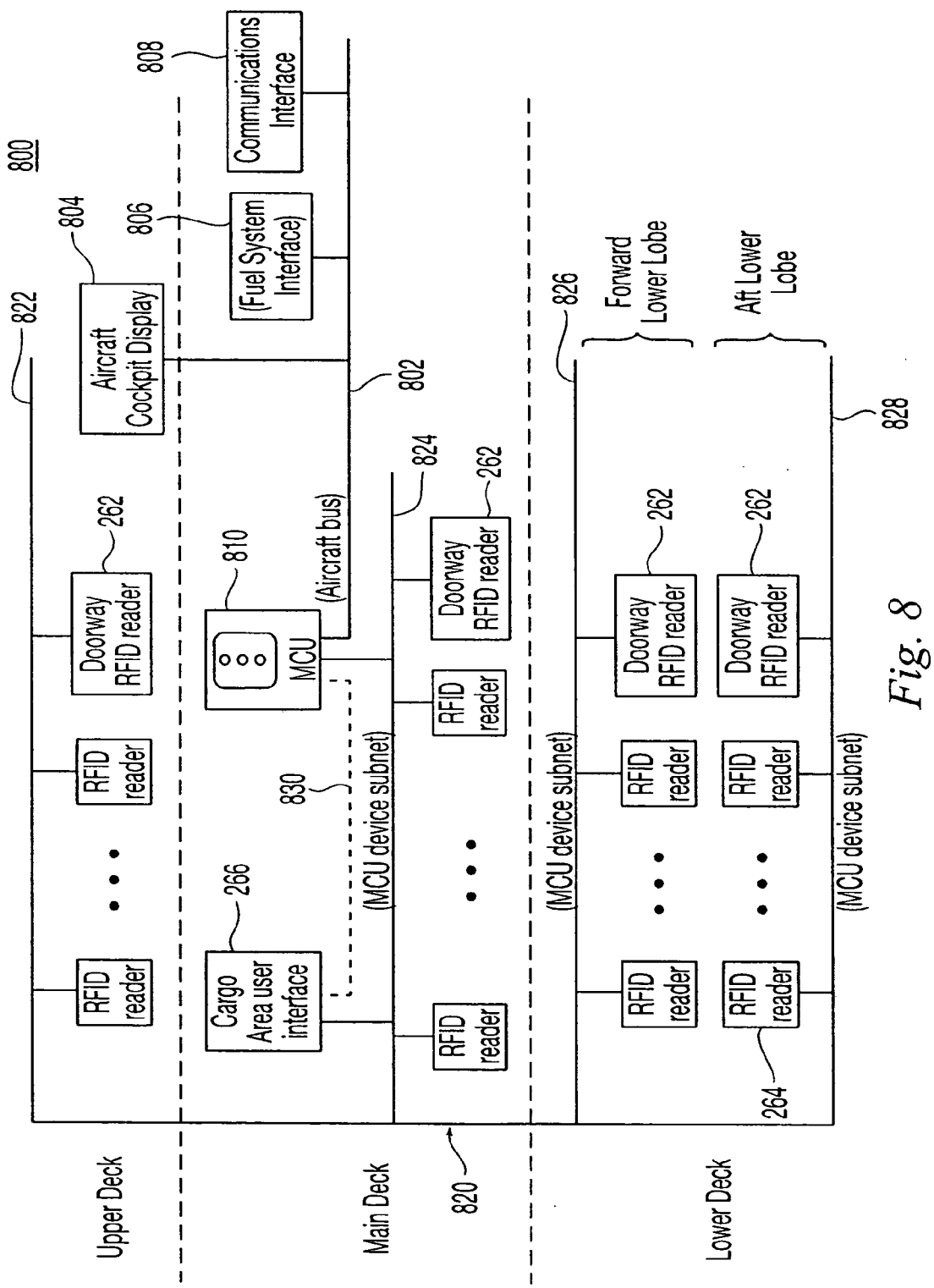
FIG. 8 is a block diagram of an aircraft cargo locating system in accordance with the present invention.

FIG. 8 is a block diagram of an aircraft cargo locating system 800 that may be used in connection with the cargo aircraft 700 of FIG. 7. The aircraft location system 800 has components on each of the three decks. It is understood that a comparable system may be established for aircraft 400, which has only two decks, or even for an aircraft 250 having only a single deck.

The heart of the cargo locating system 800 is a master control unit, or MCU 810. The MCU 810 can be any type of general purpose computer that is capable of storing and executing software programs and so includes a processor, both volatile and non-volatile memory and the like. Preferably, the MCU 810 is ruggedized and meets the various standards and requirements for aircraft-based computer systems. MCU 810 preferably is located on the main cargo deck, but this is not an absolute requirement.

The MCU's non-volatile memory stores, inter alia, information about the aircraft pertinent to weight and balance calculations. Included among these are the aircraft's Operating Weight Empty ("OWE"), preferably known to a high degree of certainty, and its center of gravity (CG) while empty, such as prior to loading cargo. As is known to those skilled in the art, the CG of an aircraft is a point in three dimensional space, almost invariably within the fuselage for most aircraft designs. Each aircraft also has a three-dimensional "CG operating volume" within which the center of gravity must lie for safe operation of the aircraft during loading, take-off, in-flight, landing, unloading and other activities. The MCU also has knowledge of this CG operating volume against which it may compare CG calculations made during loading and unloading operations.

The MCU 810 is connected to a number of different aircraft subsystems via the main aircraft bus 802. Pertinent to the present invention, the MCU 810 communicates with the cockpit user interface 804, the fuel system interface 806 and a communications interface 808, via the main aircraft bus 802.

The cockpit user interface 804 preferably presents whatever information the flight crew desires that is available from the MCU 810, or at any of the cargo area user interfaces 266. The cockpit user interface 804, like the cargo area user interface 266, may provide advanced capabilities such as graphical/text-based reporting of weight and balance information for a given flight, reports on the ULDs onboard as well as specific information for each ULD on that flight, among other things. The cockpit user interface 804 may be the primary operator interface for an aircraft cargo loading system and may, in some aircraft, fully obviate the need for a cargo area user interface 266.

The fuel system interface provides the MCU 810 with information about the aircraft's current fuel status, such as the current quantity and/or current weight of fuel onboard and the distribution of that fuel in the tanks, information useful for weight and balance calculations.

Finally, the communications interface 808 can be used to wirelessly receive and send information about the cargo and calculated weight and balance information. Thus, prior to loading, the MCU 810 may receive the cargo loading manifest, which contains information about each ULD to be loaded including its tag number, its weight, where its to be located in the aircraft, and so forth. During loading, the MCU 810 may send information to the cargo terminal about the current weight and balance condition of the aircraft.

Furthermore, upon landing, the communications interface 808 may wirelessly send information about the ULDs to the destination cargo terminal prior to unloading the aircraft. In this latter regard, the communications interface 808 may send information to a web server (not shown) which can provide information about ULD contents over the web to authorized parties. This information may be used to not only facilitate the unloading process, but also to notify the owners of the cargo, or others, that their cargo will soon arrive. Other information, such as which ULDs belong to each such owner, may also be provided to facilitate pick-up at the cargo terminal.

MCU 810 is connected to the various readers 262, 264 via a separate MCU device subnet shown generally as 820. Subnet 820, which has branches 822, 824, 826 and 828 in the various compartments, preferably is an Ethernet-type network or a Controller Area Network (CAN).

MCU 810 is also connected to the cargo area user interface 266 via the subnet 820, and this interface 266 may, as discussed above, be replicated in each compartment. In an alternate embodiment, MCU 810 may communicate with the cargo area user interface 266 via a dedicated communication link 830, which may be wireless.

Cargo area user interface 266 may be the primary interface for system 800, meaning that it will display output on behalf of MCU 810 and relay operator commands to MCU 810. When such a cargo area user interface 266 is present on each deck, each such interface may act as a primary interface for its corresponding deck. During normal operation, cargo area user interface 266 will show the loading status of the cargo compartment systems, and will provide real-time feedback regarding the cargo loading manifest or aircraft load and trim sheets (i.e., the preplanned load configuration) versus the as-loaded configuration, as detected by the readers 262, 264. The various information may be viewed in text and (in the case of location) graphical form. Cargo area user interface 266 can also be used as a local maintenance terminal for an aircraft weight and balance calculation system if an Onboard Maintenance System ("OMS") terminal is not readily available.

The number of long-range readers 264 connected to each branch of the subnet depends on such factors as the type and range of the readers, the length of the corresponding compartment and the desired ULD positional accuracy. Typically, no less than three long-range readers are placed in any one compartment while as many as eight may be placed in a 200 foot long compartment, with four on each side wall, approximately 50 feet apart, the readers on one side preferably being staggered relative to the readers on the other.

While the aircraft is being loaded, the short-range doorway readers 262 obtain all the information in each tag 260 and relay this to the MCU 810 via the cable or bus 820. This information is then stored in the MCU's memory for the upcoming flight 810 in the form of a searchable database. This database may be queried or otherwise accessed via the aircraft bus 802 or the subnet 820 and so is available at the cockpit user interface 804, the cargo area user interfaces, and perhaps other assets connected to the aircraft bus, or even wirelessly via the communications interface 808.

Both during loading, and even after the ULDs are all loaded, the tags 260 on the ULDs cooperate with the long-range readers in each compartment to provide the MCU 810 with information sufficient to determine, within a reasonable level of precision, the position of each ULD within each cargo compartment. This is made possible by the fact that the MCU 810 knows the position of each of the long-range readers and so can use triangulation methods known to those skilled in art, based on the time delay of arrival of various signals from the tags 260 at the various long-range readers 264. This location information within each cargo compartment is thus added to the database.

In one embodiment, the tags 260 are active and each tag emits a signal at a predetermined time interval. The signal includes the tag number, and perhaps other information, as well. The time interval may be fixed at the time of tag manufacture and thereafter invariable, or it may be settable by a user within some predetermined range, such as from a few sub-seconds to several hours.

In another embodiment, each wireless tag is passive, and only responds upon interrogation by a reader, in a manner known to those skilled in the art.

FIG. 11 presents a tabular report 1100 showing some of the information available from the thus-prepared database. Generally speaking, the database is a relational database which has a record for each tagged ULD 252. The database is fully searchable and sortable using the various categories of information or the data within each category, and is configured to produce reports, as needed. In the tabular report 1100, the categories listed include the unique tag number 1102, the ULD type 1104, the compartment into which that ULD was loaded, the grid location within the compartment 1108, the final destination of that ULD 1110, its gross weight 1112 and its ownership/contents 1114. It is understood that reports with other categories of information may also be produced. It is further understood that a wide variety of other queries such as "identify all ULDs weighing more than 300 kg going to Berlin" may also be handled. Furthermore, due to the architecture of system 800, authorized platforms other than the user interfaces 266, 804 may be able to obtain information about such things as the compartment, contents, destination, etc. of each ULD onboard the aircraft.

Furthermore, during the loading process, the MCU 810 can compare the tag/reader-determined actual location of each ULD with information in the cargo loading manifest, such as the data associated with the pre-planned load configuration that was planned for the flight. Any discrepancies between the two can be displayed on a cargo area user interface 266, cockpit user interface 804 or other device, thereby notifying personnel that there seems to be a departure from the original plan, and allowing any needed changes before loading continues.

As stated above, during the loading process, the MCU obtains information about the weight of each ULD 252 based on information from its tag 260. This can happen in one of two ways. First, in those instances where the tag's memory stores the ULD's gross weight information in a data field 312, the gross weight information may be relayed to the MCU 810 via the doorway reader. Second, in those instances where the tag 260 does not store gross weight information, but the cargo loading manifest includes information that associates the gross weight of each ULD with its tag number, the MCU 810 can use the tag number, relayed by the doorway reader, to look up the weight of that ULD. A third way for the MCU to learn the gross weight of a ULD using the doorway ball 282 mat with load cells 284 is discussed below.

Regardless of how the MCU learns the weight of the ULD, this gross weight information, coupled with each ULD's calculated position information, information from the fuel system interface 806 and knowledge about the aircraft's OWE and OWE center of gravity, allows the MCU 810 to calculate a total aircraft weight and also the aircraft's current center of gravity. Moreover, these calculations can be made in real time, as the aircraft is loaded with cargo. If either parameter is not within allowable limits, an alarm (visual, aural, etc.) may be triggered to draw attention to the condition. In addition, a signal may be sent to disable or otherwise suspend the cargo loading system to ensure that a tip condition (i.e., the aircraft tipping on its tail) does not arise. In such case, further loading is prevented until appropriate, remedial action such as removal or re-positioning of at least some of the ULDs is taken.

Furthermore, in a preferred embodiment, the total weight of the aircraft is verified at predetermined intervals and entered as calibration data via the cargo area user interface 266, cockpit user interface 804 or other input means.

In addition, as the ULDs are being loaded, the cargo area user interface 266 and/or the cockpit user interface 804 may be used to graphically show information about such things as the position of the ULDs and the aircraft's center of gravity, in real time.

Figure 12A:
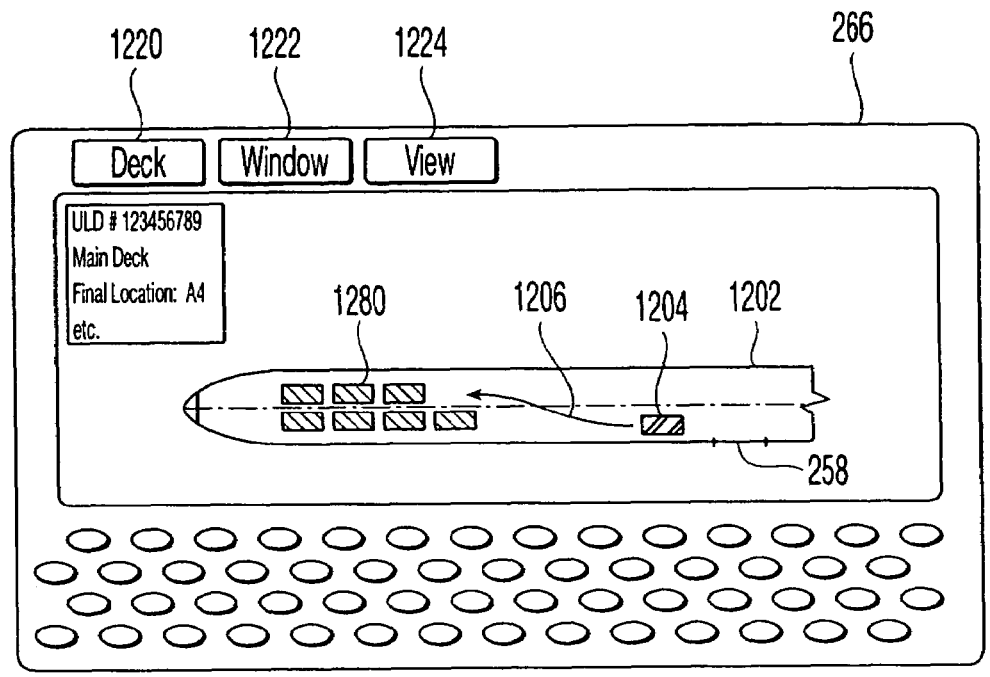
FIG. 12a shows a sample window on a display depicting ULDs in real-time, as a cargo deck is being loaded.

As seen in FIG. 12a, one window may be used to depict a particular deck 1202 of the aircraft, with the ULDs being loaded thereon designated by icons 1204, 1208. In this figure, a recently loaded ULD 1204 which entered the aircraft through doorway 258 is being moved in the direction of arrow 1206 to its final position. Previously loaded ULDs 1208 are also shown on the display. Preferably, ULDs that have not yet reached their final position are distinguished on the display from ULDs that have. Once a recently loaded ULD 1204 reaches its final location on the deck, the MCU 810 checks to see whether that ULD's location, as determined by information from the tag readers (not shown in FIG. 12a) on that deck, matches the final location information from the cargo loading manifest. If there is a match, the appearance of the ULD's icon changes in some manner to signify on the display that it has indeed reached its final location. Thus, as seen in FIG. 12a, recently loaded ULD 1204 is shown with one shading pattern while previously loaded ULDs 1208 are shown in a second shading pattern. It is understood that different icon shapes, icon colors, icon sizes, etc. may be used instead to provide the distinction. Preferably, the window includes a sub-window 1210 presenting information about the newly loaded ULD 1204 that is being moved. The sub-window 1210 may present some, or all, of the information carried by the tag (see FIG. 3) on the recently loaded ULD 1204. Similar information about any one of the previously loaded ULDs 1208 may be obtained by moving a cursor over the ULD of interest, thereby providing the operator with information about any of the ULDs on that deck. Furthermore, as also seen in FIG. 12a, an operator is provided with a 'deck' button 1220 for selecting the deck to be viewed, a 'window' button 1222 to switch to another window on the display, and a 'view' button 1224 to change how the information is represented.

Figure 12B:
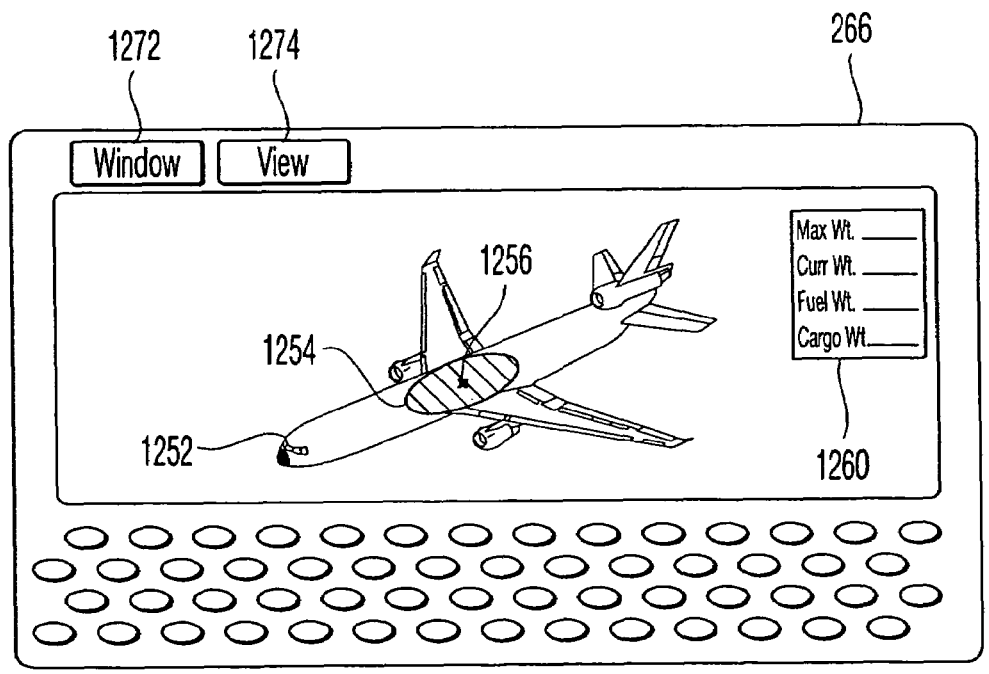

As seen in FIG. 12b, another window may be used to depict information associated with the center of gravity, in real time. For this, a perspective view of the aircraft's outline 1252 is provided. The three-dimensional CG operating volume 1254 is superimposed on the aircraft's outline 1252 and the current center of gravity is depicted by a center of gravity icon 1256. As the aircraft is loaded with additional ULDs, the position of the center of gravity icon 1256 may change, but normally only within the boundary of the CG operating volume 1254. Preferably, a sub-window 1260 is provided to present information about the aircraft's maximum gross weight, current weight, fuel weight, total cargo weight and the like. Information about the center of gravity, such as its current position in X, Y, Z coordinates, distance from the boundary of the CG operating volume, safety margin information, and the like, may also be provided in sub-window 1260. Furthermore, as also seen in FIG. 12b, the operator is provided with a 'window' button 1272 to switch to another window on the display of the cargo area user interface 266, and a 'view' button 1274 to rotate the aircraft outline 1252 to change the perspective view. While in the preferred embodiment, the aircraft's outline 1252 is displayed, it is understood that one may instead simply show the icon representing the CG in some area representing the CG operating volume.

MCU 810 also communicates with the cockpit via aircraft bus 802 as necessary to display weight and balance information to the flight crew on the cockpit user interface 804. MCU 810 may also utilize a wireless network protocol such as 802.11a, 802.11b, 802.11g, 802.11n, 802.16, etc. (collectively, 802.1x), to communicate either with the cargo terminal, a wireless handheld device, or a laptop computer carried by the Load Master (i.e., the person responsible for loading the aircraft) to determine all necessary loading information and to confirm the final loaded position of all ULDs.

As mentioned above, the short-range doorway readers 262 are used to detect each ULD as it enters the compartment associated with a particular doorway, and it is at this point that the weight and detailed cargo information is obtained by the doorway reader and sent on to the MCU 810. It is not until after a doorway reader 262 tells the MCU 810 that a particular ULD is onboard, that the MCU acknowledges information from any of the long-range readers 264 about that ULD. In this manner, MCU 810 ignores or otherwise rejects any information gathered by long-range readers on a given deck about ULDs that are either outside the aircraft or on other decks of that same aircraft. And when coupled with the cargo loading manifest information about the pre-planned load configuration sent to the MCU 810 prior to the commencement of any loading, this feature can immediately prevent an incorrect ULD from being loaded, thereby eliminating the need to unload an entire compartment to remove a single ULD and correct the situation later.

To confirm the weight information that may have been pre-programmed on each ULD tag 260, or to provide weight and balance information when an aircraft is operating in an area with either no wireless tags on the ULDs, or no support for writing to the wireless tags as the individual ULDs are loaded with cargo, load cells 284 (FIG. 10) may be used to determine the weight of the ULDs 252 as they are brought into the aircraft.

Figure 10:
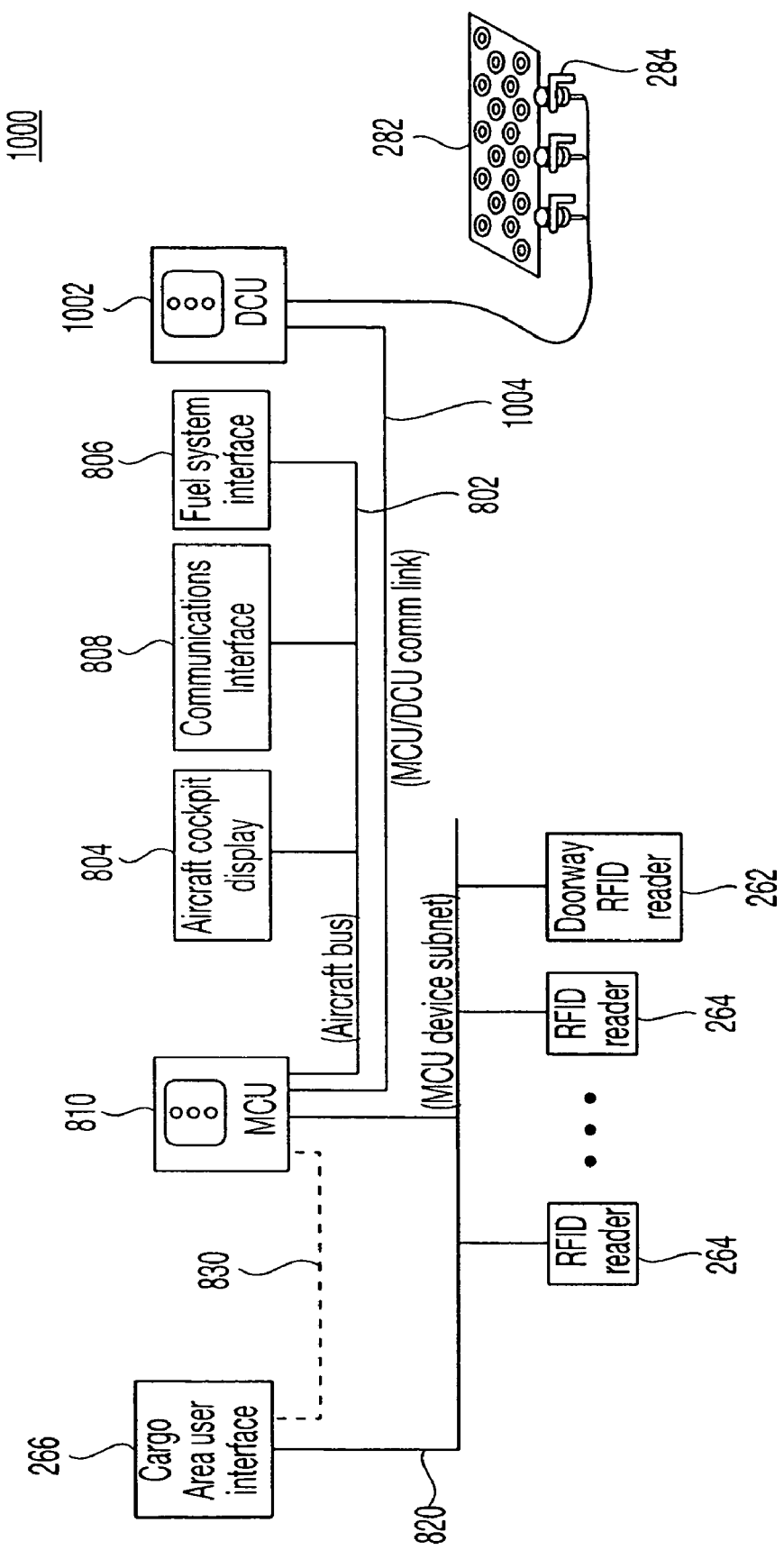
FIG. 10 is a block diagram of an aircraft cargo locating system that includes a load cell.

In one embodiment, the "omni area" (i.e., areas that allows cargo to be moved in a variety of directions) immediately inside the doorway 258 can be equipped with a ball mat 282 equipped with load cells 284 to weigh the ULDs, as they are brought through the doorway area, as seen in FIGS. 2c and 10.

FIG. 10 presents a block diagram of an aircraft cargo locating system 1000 that includes load cells 284 associated with a ball mat 282. System 1000 includes Doorway Control Units ("DCUs") 1002 that interface with load cell sensors 284. DCUs 1002 (one for each compartment) will pass the information to MCU 810 via connection 1004, which may also be Ethernet, for subsequent use in weight calculations. DCUs 1002 can be general purpose computers having a processor and memory and other conventional features.

To provide balance information in system 1000, the MCU 810 will track the position of each ULD 252 by the unique tag number as in the system 800, but the weight information will be maintained by the MCU 810 internally, since the information would not be available on the tag 260. However, the weight and balance information, CG information, etc., can still be computed as described earlier.

In a preferred embodiment, prior to loading the ULDs, a memory associated with the MCU 810 is loaded with cargo loading manifest information. This cargo loading manifest information includes, among other things, the tag number and gross weight of each ULD, the gross weight having been previously determined when the ULD was loaded with cargo items at the cargo terminal or other location. Furthermore, as discussed above, as a ULD enters through doorway 258, the doorway reader 262 detects at least the tag number and this is passed on to the MCU 810, as well. And as that ULD is brought onboard, the load cells 284 provide a newly determined weight of the ULD and this, too is passed on to the MCU 810. Thus, the MCU 810 can use the detected tag number to reference the ULD's previously determined weight in the cargo loading manifest information, and compare the previously determined weight with the newly determined weight provided by the load cells 284. If the two match, there is no problem. If, however, the two do not match, then the MCU 810 outputs a signal to signify that there is a discrepancy.

Thus, systems 800 and 1000 both allow a check for concurrence with the weight measurements and wireless tag programming performed at the cargo terminal. This redundancy, together with the immediate feedback provided to the Load Master at the user interfaces 266, 804 gives the system an important enhancement to safety to determine if anyone has removed any cargo from a ULD (e.g., theft), or added any cargo to the ULD (e.g., unauthorized or illicit cargo).

Figure 9A:
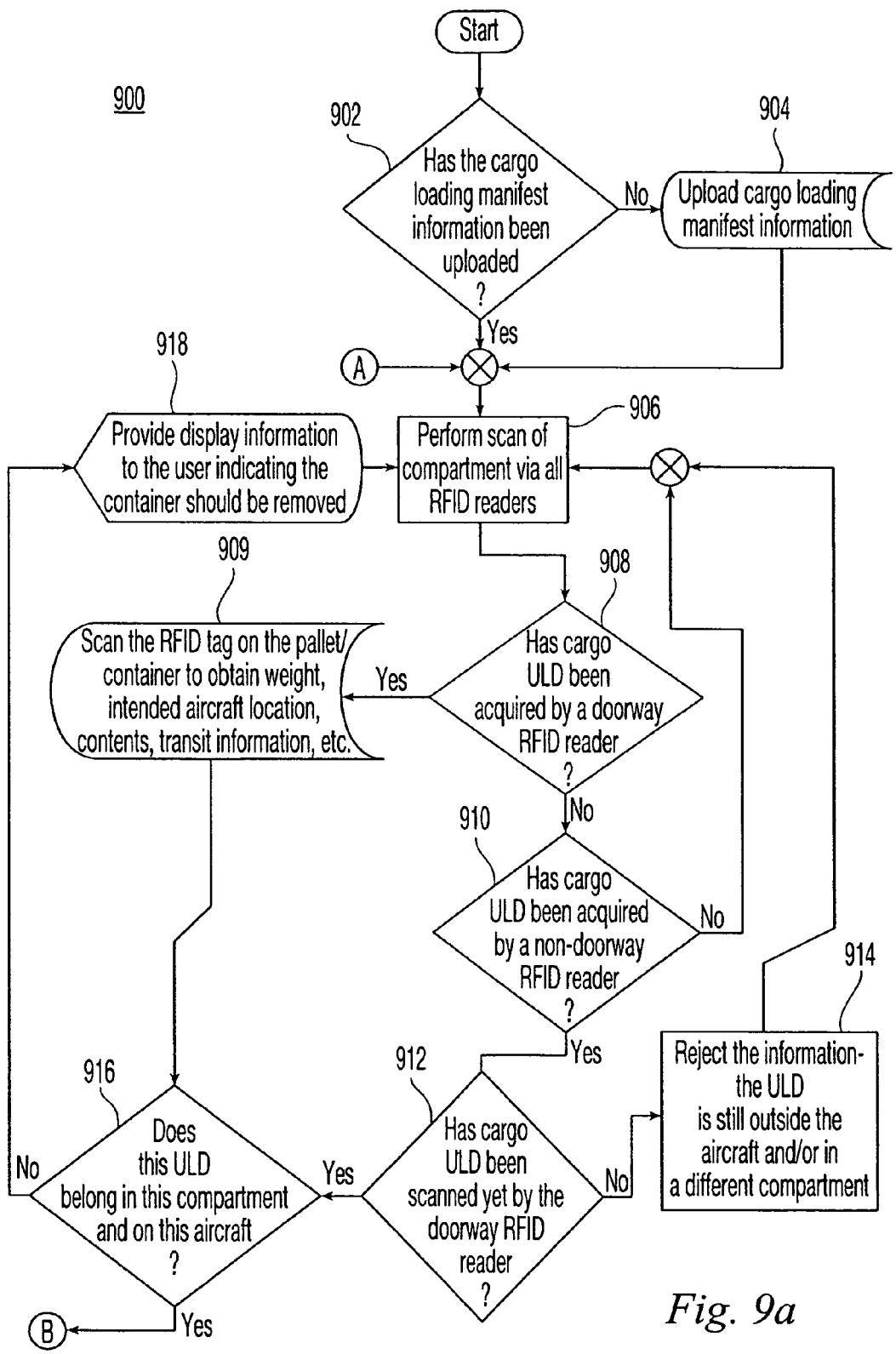
FIGS. 9a & 9b present a flowchart of the functionality performed by a Master Control Unit (MCU) in accordance with one embodiment of the present invention in order to implement the cargo locating system.
Figure 9B:
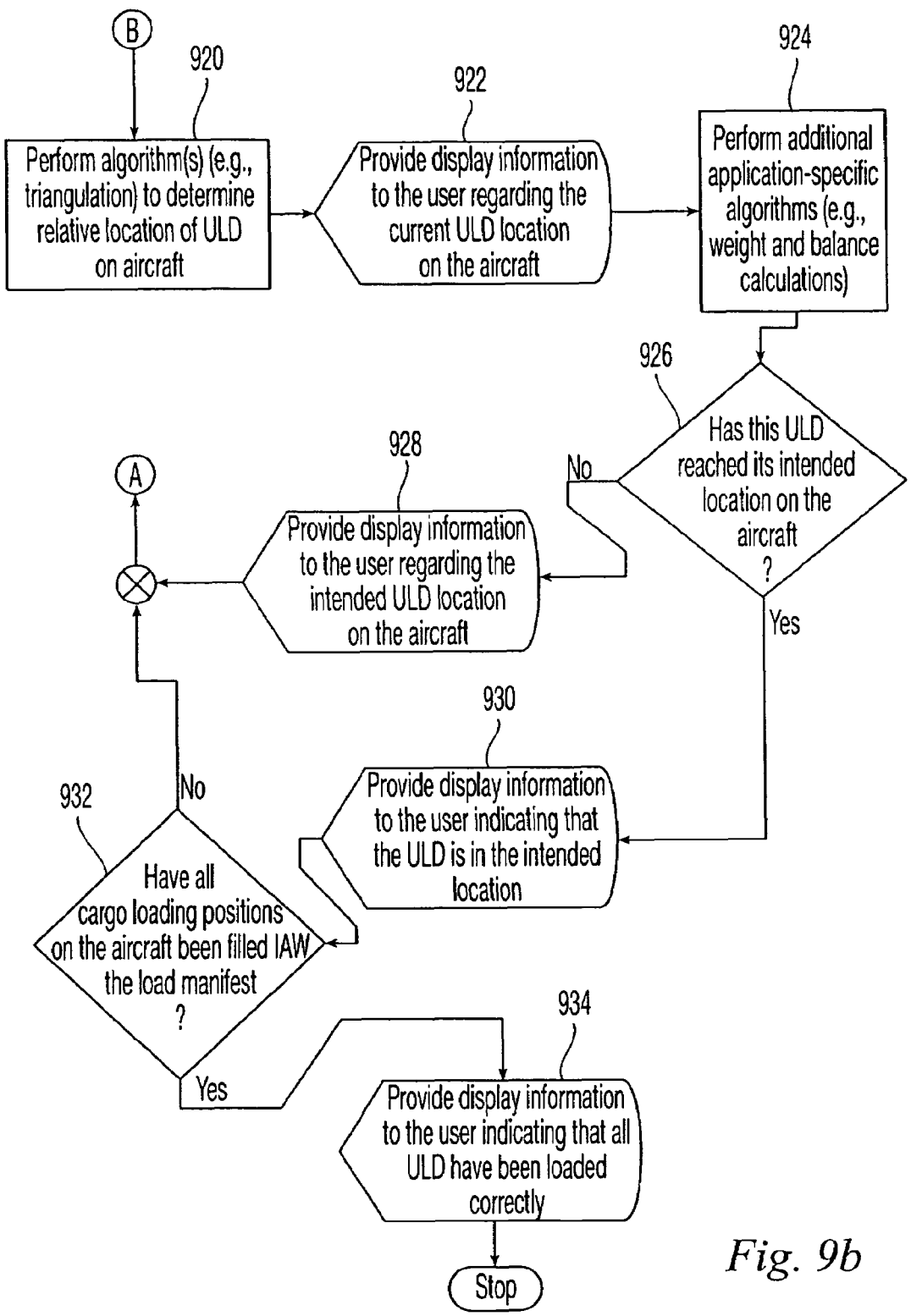

FIG. 9 is a flowchart 900 showing the functionality of the ULD loading software process that is executed by MCU 810 in accordance with one embodiment of the present invention. This particular software process is more or less a continuous loop that executes during the entire loading process. It is understood, however, that the functionality described herein may be performed by hardware, or any combination of hardware and software.

It is further understood that other software processes, such as the process that triggers an alarm if a tip condition is imminent, or the process that controls the cargo loading system, may also be executing simultaneously on the MCU 810. It is further understood that the various software processes may share data with one another through dynamic data exchange (DDE), object linking and embedding (OLE) or other protocols known to those skilled in the art.

At decision point 902, it is determined whether the cargo loading manifest information (i.e., the "pre-planned load configuration") has been uploaded into the MCU 810 and stored in memory. This information can be received by the MCU via a wired or wireless network, or by any other method.

If the information has not been uploaded, then in step 904 it is uploaded to the MCU from stored data.

At step 906, a scan is performed of each aircraft compartment using all of the tag readers. The scan looks for new ULDs, i.e., ULDs that have either not previously been "registered" by a doorway reader or have reached their final location within the aircraft.

At decision point 908 it is determined whether a new ULD has been acquired by a doorway reader 262.

If the answer at step 908 is 'no', then at decision point 910, it is determined whether a new ULD has been acquired by a non-doorway reader 264.

If the answer at decision point 910 is 'no', no new ULDs have been acquired and so flow returns to box 906 to continue scanning.

If the answer at decision point 910 is 'yes', then at step 912 it is determined whether the newly acquired ULD has been scanned by the doorway reader 262 corresponding to the compartment where the non-doorway reader is located.

If the answer at step 912 is 'no', then the information acquired at step 910 is rejected because the ULD is still outside the aircraft or in a different compartment. The flow then returns to box 906 to continue scanning.

If the answer at step 912 is 'yes', then at decision point 916, it is determined whether the detected ULD belongs to the aircraft and the particular compartment.

If the answer at step 916 is 'no', then at step 918 the information is sent to the user interface 266 indicating that the container should be removed. At this point, either MCU 810 by itself, or the operator at user interface 266 may suspend the loading system until corrective action is taken. Flow then returns to step 906 to continue scanning.

If the answer back at step 908 is 'yes' (that the new ULD was indeed acquired by a doorway reader), then control flows to step 909 where the information on the tag 260 is obtained and stored in the database at the MCU 810. Flow then moves to decision point 916.

If the answer at step 916 is 'yes', then at step 920 an algorithm (e.g., a triangulation algorithm) is executed to determine the location of the ULD on the aircraft. At step 922, this location is displayed to the operator at user interface 266.

At step 924, other aircraft-specific calculations are made, such as determining the weight and balance of the aircraft, based on the weight and location of the new ULD.

At decision point 926, it is determined whether the new ULD has reached its intended location on the aircraft. If not, then at step 928, information regarding the intended location of the new ULD is displayed on user interface 266, and flow returns to box 906 to continue scanning.

If the answer at decision point 926 is that the new ULD has indeed reached its final destination, then at step 930, information indicating that the ULD is in the intended and correct location is displayed to the user, and flow goes to step 932.

At step 932, a check is made to see whether all the ULDs have been brought onboard and placed in their final positions in accordance with the cargo loading manifest (thereby indicating that the loading procedure has been completed). If not, flow returns to box 906 to continue scanning.

If, on the other hand, at step 932, it is determined that all the ULDs are in their final positions, then at step 934 a message is sent to the user interface 266, thereby notifying the operator that all ULDs have been loaded correctly. Upon completion of the loading, a similar message or other signal indicating successful completion may be sent via the communications interface, either under operator control, or automatically, to the cargo terminal.

As disclosed, embodiments of the present invention use wireless tags and readers to implement a real time cargo locating system on an aircraft. The system may be used to track and confirm cargo information after loading onto an aircraft, including but not limited to, current cargo location, intended cargo location, contents, weight, intended transport aircraft, and cargo transit source/destination information. Because the weight and location of the cargo that is loaded on board the aircraft is known with a relatively high degree of accuracy, the system can also be used as part of an aircraft Weight and Balance system. The system is also able to confirm that all loaded cargo has been loaded in the correct location on the aircraft. In addition, embodiments of the invention will be able to query any information about cargo that has been loaded through a display system, and embodiments are capable of interfacing with airport/cargo terminal real time locating systems via a wireless network or other network methods.

The various components of the system and invention described above can either be installed at the time the aircraft is built, or may be added to an existing aircraft. In the latter case, the aircraft in question can be retrofitted with the appropriate readers 262, 264 and their associated antennas, user interface(s) 266, cabling for communication, the MCU 810, along with any needed software for the MCU and/or the user interfaces 266. The ball mat 282 and load cells 284 and DCU 1002 may also be installed later on.

It is understood, however, that the hardware capabilities provided by the MCU 810 may already exist in one or more onboard computers which only need to be loaded with the software needed implement the present invention, and connected to the readers. The user interfaces 266 and the readers 262, 264 themselves may be off-the shelf equipment, as is the cabling.

In view of the foregoing, it is envisioned that the present invention may be marketed just as software on a computer readable medium, such as a CD or DVD, with appropriate instructions, it being left to the system integrator to obtain various commercial off the shelf (COTS) equipment and perform the installation. Alternatively, the invention may be provided as a complete kit with not only the software, but also the necessary hardware, including an MCU 810, one or more user interfaces 266, tag readers (the number of each type depending on the aircraft to be retrofitted), cabling, and even the ball mats 282, load cells 284, and DCU 1002. It should be evident that various combinations of these may also be provided, depending on a customer's needs.

From all the foregoing, it can be seen that a system in accordance with the present invention may be configured to perform a number of tasks or functions. Included among these are the ability to locate, track and confirm cargo loaded onto an aircraft. The system is also able to calculate a weight and center of gravity for the aircraft, thereby providing an alternative to relying on load cells placed on the wheel assemblies and/or landing gear to help gauge the weight of the aircraft and also to predict whether a tip condition in imminent.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An aircraft cargo locating system for locating a plurality of unit load devices (ULDs) in an aircraft, wherein each ULD has a wireless tag affixed to it, each wireless tag comprising tag information including at least a tag number, said system comprising:
   a plurality of tag readers for reading the wireless tags, each tag reader being mounted on a surface of an aircraft; and
   a processor coupled to said tag readers, said processor programmed to receive tag information from the plurality of tag readers and calculate an interior position of each of the ULDs within the aircraft, from the tag information.

2. The system of claim 1, wherein at least one of the plurality of tag readers is associated with a doorway of the aircraft.

3. The system of claim 2, wherein the processor is programmed to determine, based at least in part on information received from the tag reader associated with said doorway, whether a ULD is located inside or outside the aircraft.

4. The system of claim 2, wherein the processor is programmed to determine, based at least in part on information received from the tag reader associated with said doorway, whether a ULD is located in a correct compartment of the aircraft.

5. The system of claim 1, wherein:
   a first type of tag reader is located close to a doorway of the aircraft and a second type of tag reader is located away from said doorway;
   the first type of tag reader is capable of receiving information from tags up to a first distance and the second type of tag reader is capable of receiving information from tags up to a second distance; and
   the second distance is greater than the first distance.

6. The system of claim 5, wherein the first type of tag reader receives tag information that includes a tag number associated with a particular ULD and a weight associated with that ULD.

7. The system of claim 5, wherein the processor is programmed to ignore signals received by a second type of reader located on one deck, if said signals are from a ULD located on a different deck.

8. The system of claim 1, further comprising a user interface coupled to said processor, said user interface comprising a display configured to show an icon representing a real-time position of a ULD onboard the aircraft.

9. The system of claim 8, wherein an appearance of the icon changes, when the ULD reaches its final destination onboard the aircraft.

10. The system of claim 8, wherein the user interface is located in a cargo area of the aircraft.

11. The system of claim 8, wherein the user interface is located in a cockpit of the aircraft.

12. The system of claim 1, further comprising a user interface coupled to said processor, said user interface comprising a display configured to graphically depict a real-time position of a center of gravity of the aircraft.

13. The system of claim 12, wherein the user interface is located in a cargo area of the aircraft.

14. The system of claim 12, wherein the user interface is located in a cockpit of the aircraft.

15. The system of claim 1, wherein the processor is programmed to determine at least one of a weight and a balance of the aircraft based at least in part on the tag information.

16. The system of claim 15, wherein the tag information comprises a weight of a corresponding ULD.

17. The system of claim 15, wherein the processor is programmed to determine said at least one of a weight and a balance based at least in part on a current fuel status of the aircraft.

18. The system of claim 1, further comprising at least one load cell coupled to said processor and positioned in an area suitable for determining a weight of a LILD.

19. The system of claim 18, wherein the processor is programmed to determine at least one of a weight and a balance of the aircraft.

20. The system of claim 18, wherein
   said processor is provided with cargo loading manifest information including at least a tag number and a previously determined weight of at least one ULD; and
   said processor is programmed to compare said previously determined weight with a newly determined weight of said at least one ULD, said newly determined weight being determined from said at least one load cell, and output a signal if the previously determined weight does not match the newly determined weight.

21. The system of claim 1, wherein
   said processor is provided with cargo loading manifest information including at least a tag number and a desired final location within the aircraft of each ULD.

22. The system of claim 21, wherein the processor is configured to compare the desired final location of a particular ULD with an actual final location of that ULD, the actual final location being determined by said tag information received from at least one of said plurality of tag readers.

23. The system of claim 22, wherein the processor is configured to indicate on a display when said particular ULD reaches its desired final location.

24. The system of claim 1, wherein at least one tag reader is configured to receive, and then forward to the processor, tag information comprising a weight of a corresponding ULD.

25. The system of claim 1, wherein at least one tag reader is configured to receive, and then forward to the processor, tag information comprising a flight number of the aircraft.

26. The system of claim 1, further comprising a communications interface coupled to the processor and configured to wirelessly send at least a portion of the tag information to a destination, prior to unloading the aircraft.

27. A method of locating a unit load device (ULD) device on a deck of an aircraft comprising:
   mounting a plurality of tag readers in a cargo compartment of an aircraft;
   receiving, at said plurality of tag readers, tag information from a wireless tag affixed to the ULD; and
   calculating an interior position of the ULD within the cargo compartment of the aircraft based on the tag information received at said plurality of tag readers.

28. The method of claim 27, further comprising:
   ignoring tag information from at least one wireless tag received at a tag reader that is on a deck different from the deck of the ULD whose interior position is being determined.

29. The method of claim 27, further comprising:
   receiving first information from a tag reader associated with a doorway of the aircraft; and
   determining whether a first ULD is inside or outside of the aircraft based on the first information.

30. The method of claim 28, further comprising:
determining whether the ULD is in a correct compartment of the aircraft based on the first information.

31. The method of claim 27, further comprising:
determining a weight of the ULD based on the tag information; and
calculating at least one of a weight and a balance of the aircraft from the weight and interior position of the ULD.

32. The method of claim 27, further comprising:
storing cargo loading manifest information including at least a tag number and a desired final location within the aircraft of each ULD.

33. The method of claim 27, further comprising:
storing cargo loading manifest information including at least a tag number and a weight of each ULD.

34. The method of claim 27, further comprising:
determining an actual weight of the ULD after it has entered the aircraft;
comparing the actual weight of the ULD with a previously determined weight associated with the tag information.

35. The method of claim 34, comprising receiving said previously determined weight from a memory of said wireless tag.

36. The method of claim 34, comprising referencing said previously determined weight with a tag number of said wireless tag.

37. An aircraft cargo locating system for locating a plurality of unit load devices (ULDs) man aircraft, wherein each ULD has a wireless tag affixed to it, each wireless tag comprising tag information including at least a tag number, said system comprising:
means for reading the wireless tags, said means for reading being mounted on a surface of an aircraft; and
processor means coupled to said means for reading, said processor means receiving tag information and calculating an interior position of each of the ULDs within the aircraft, from the tag information.

38. The system of claim 37, further comprising:
means for determining a weight of the ULD based on the tag information; and
means for calculating at least one of a weight and a balance of the aircraft from the weight and the interior position of the ULD within the aircraft.

39. An aircraft comprising:
a cargo compartment provided with a plurality of tag readers spaced apart along opposing side walls thereof, each tag reader capable of receiving information from a wireless tag;
a processor coupled to said plurality of tag readers and configured to determine interior positions of wireless tags based on tag information received by said tag readers, when said wireless tags are present in said compartment; and
a user interface configured to display output from the processor that is derived from information received by said plurality of tag readers.

40. The aircraft according to claim 39, wherein
a first type of tag reader is close to a doorway of the aircraft and a second type of tag reader is located away from said doorway;
the first type of tag reader is capable of receiving information from tags up to a first distance away and the second type of tag reader is capable of receiving information from tags up to a second distance away; and
the second distance is greater than the first distance.

41. The aircraft according to claim 39, further comprising at least one load cell provided in an omni area of the cargo compartment.

* * * * *

UNITED STATES PATENT AND TRADEMARK OFFICE
CERTIFICATE OF CORRECTION

PATENT NO. : 7,198,227 B2 Page 1 of 1
APPLICATION NO. : 10/864465
DATED : April 3, 2007
INVENTOR(S) : Craig J. Ollin et al.

It is certified that error appears in the above-identified patent and that said Letters Patent is hereby corrected as shown below:

Column 16, line 48, "device (ULD) device" should read --device (ULD)--.

Column 17, line 29, "man aircraft" should read --in an aircraft--.

Signed and Sealed this

Twenty-second Day of July, 2008

JON W. DUDAS
*Director of the United States Patent and Trademark Office*